May 30, 1967  K. R. SCHNEIDER  3,322,602
ARTICLE DELIVERING MACHINE
Filed Jan. 9, 1963  11 Sheets-Sheet 1

INVENTOR
KURT R. SCHNEIDER

BY *Mason, Porter, Diller & Stewart,*

ATTORNEYS

May 30, 1967 K. R. SCHNEIDER 3,322,602
ARTICLE DELIVERING MACHINE
Filed Jan. 9, 1963 11 Sheets-Sheet 7

INVENTOR.
KURT R. SCHNEIDER
BY
Mason, Porter, Diller & Stewart,
ATTORNEY

INVENTOR
KURT R. SCHNEIDER

ATTORNEYS

United States Patent Office 3,322,602
Patented May 30, 1967

3,322,602
ARTICLE DELIVERING MACHINE
Kurt Rudolf Schneider, Bainbridge, N.Y., assignor to Eureka-Carlisle Company, a corporation of Delaware
Filed Jan. 9, 1963, Ser. No. 250,393
16 Claims. (Cl. 156—571)

This invention relates to improvements in machines for delivering a succession of articles along a predetermined path.

The invention is illustrated as applied to a labeling machine as shown in my Patent 2,754,022 and in Patents 2,907,567 and 3,010,864.

In these patents a stack of articles such as envelopes, postal cards, magazines and catalogs is provided, and the articles are withdrawn, one by one, from the stack and delivered past a point at which a label is applied to each article: and means are provided for synchronizing the movement of the article and the label so that the application occurs at a selected area of the article, and for preventing the advancement of the article if a proper label is not ready for application thereto, and for preventing the feeding of a label if an article is not being advanced for receiving the label.

In these prior patents, a fixed table was provided, with guide or cheek plates thereon for controlling the articles in the stack. When it was desired to change the machine from employment with articles of one width to use articles of a different width, it was necessary to shift the cheek plates relative to one another. Also, when it was desired to change the point of application of the label transversely relative to the direction of article feed, a like shifting of the cheek plates was needed: when such a transverse change of label location was desired during the course of feeding the articles, both the cheek plates and the stack of articles between them required shifting. In practice, a mailing room may have most of its work concerned with one or a few standard sizes of articles with standard label locations thereon. The preparation time in shifting from one size and location to another, in passing from one "run" to another, with the testing required, represents an economic loss to the mailing room operator.

Such patents are illustrative of machines in which articles are to be temporarily stored and then advanced along a predetermined path for an operation, such as the labeling of the said patents, to be performed at a selected point on the article: and in which change of the selected point is to be accomplished by change of position of the article as it is released for movement along said path.

This invention has for an object the provision of a machine in which removable structures are present including guides and other parts which can be individually pre-set for a standard size of article whereby the time for change from one standard size to another is that of removing one such structure and substituting another.

Another object is the provision of a machine in which the relative transverse position of the article at the application point can be varied by small increments and during the course of performance of the operation upon the successive articles.

Another object is the provision of improved devices for supporting and guiding, and for delivering the articles at phase-timed intervals of the operation of the applying devices.

Another object is the provision of a machine having a removable stack supporting and guiding device with means of advancing the articles to position for individual delivery to and acceptance by the labeling structures, together with interengaging parts by which the supporting and guiding devices are brought to and held in proper position for cooperating with the labeling structures by the placing of the devices in interlocking relation with parts on the labeling structures.

Another object is the provision of a machine having a removable stack supporting and guiding device with article feed controlling means thereon, together with interengaging parts on an operation-performing structure and on the removable device whereby the placing of the removable device in position by interengaging of said parts establishes a proper correlation thereof which is thereafter maintained by gravity and without the need of adjusting and locking the device to the structure when the device is being returned to the structure for further feeding of the articles which were being treated prior to the removal of the device.

Another object is the provision of separator structures for assuring the delivery of articles one-by-one, and of simple form and mounting, and competent of being mounted upon a removable feeding or hopper table so that the parts which require adjustment according to the width, stiffness and thickness of the individual articles are present on a removable assembly so that adjustment for one standard size can be maintained by such assembly when removed and the assembly is ready for service with further articles of said standard size upon replacing the assembly upon the operation apparatus frame.

With these and other objects in view, as will appear in the course of the following description and claims, illustrative embodiments of the invention are shown on the accompanying drawings, in which:

FIG. 7A shows a modified form of parts of FIG. 7, on a larger scale;

FIG. 7B shows a section substantially on line 7B—7B of FIG. 7A.

Figure 1:
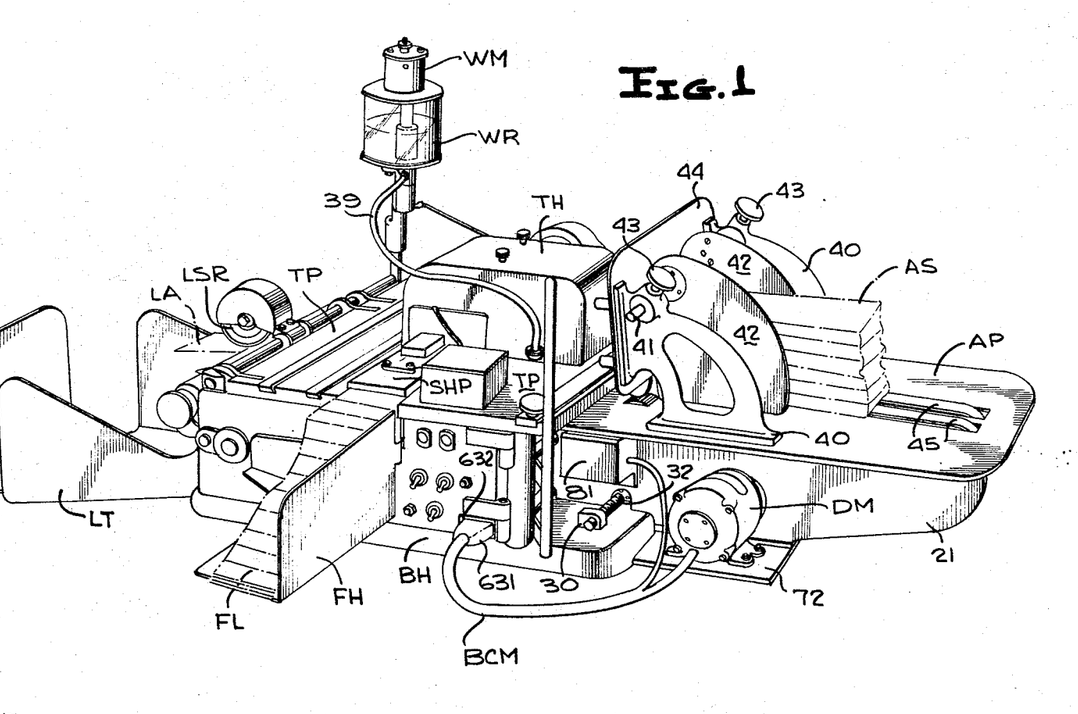
FIG. 1 is a perspective view showing parts of a label applying apparatus, in conjunction with an article delivering device according to this invention.
Figure 2:
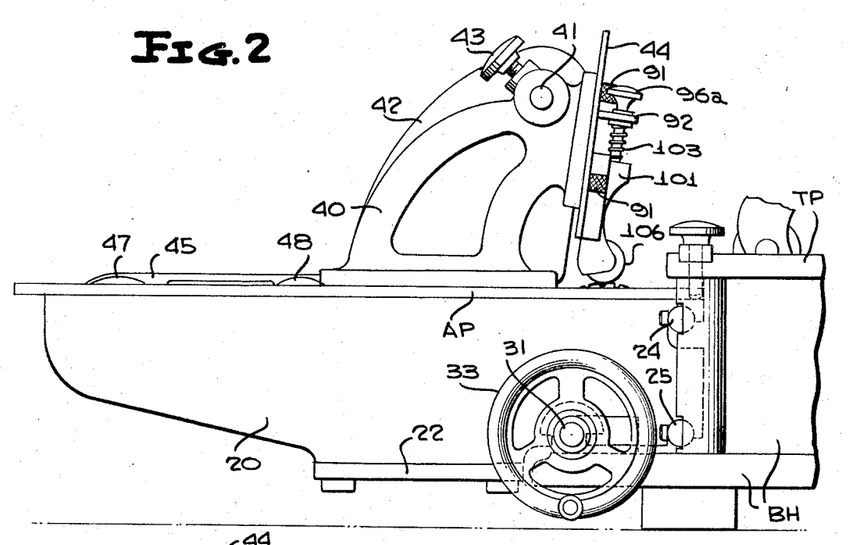
FIG. 2 is a side elevation of the delivering device of FIG. 1, with parts of the applying apparatus.
Figure 3:
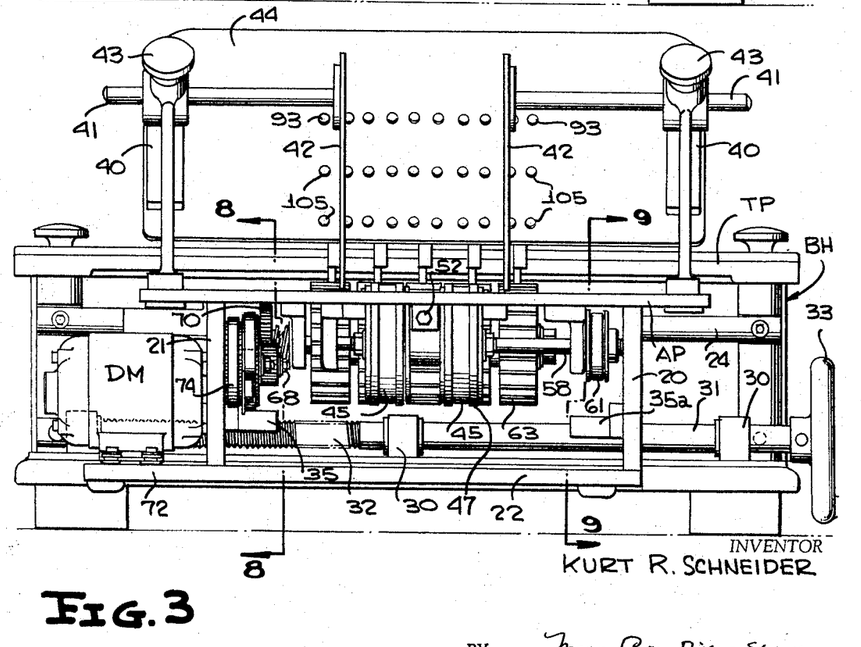
FIG. 3 is an end elevation of the structure in the direction of the arrow of FIG. 2.

The composite structure of FIG. 1 includes an applying mechanism base BH having a top plate TP along which labels may be fed in a direction transverse to the advancement of articles, e.g. as a fan-fold strip FL from a holder FH. The strip of labels is advanced beneath a label top plate SHP and into a punch housing TH. The advancement of the strip and the movement of a severing and applying punch may be provided by shuttle bars and drive means operating in cycles as set out in the said patents to which reference is made for forms of structures to accomplish the purposes: details thereof are not claimed herein. The cycling devices can include parts for wetting an area of the article appropriate for receiving the gummed label, as taught in the said patents, wits supply of wetting liquid from a reservoir WR through a hose 39 and under control of a solenoid WM. The articles are fed beneath the top plate TP, being taken for example by a driven stage roller SR (FIG. 5) beneath a counter-roll TR and so carried forward, receive their labels by a cyclically driven punch in a housing TH, and continue forward in their longitudinal feed direction and issue from the machine as shown for the labeled article LA in FIG. 1, and are collected in a tray LT. In leaving the applying mechanism, the labeled articles can be contacted by a sponge roll LSR to remove excess moisture therefrom. An article feed motor DM, independent of the motor EM for driving the parts on base BH, is connected by a cable BCM (FIGS. 1, 14) with separable connectors 631, 632, to the circuitry for parts on the base BH: a solenoid in housing 81 is connected in parallel to the motor DM.

The base BH has upstanding portions as set out hereafter, and walls are associated therewith, to provide a housing beneath the plates AP and TP: this housing contains and protects mechanical and electrical parts illustratively as in the aforesaid patents.

According to the form of the invention shown in FIGS. 1–13, the stack of articles is supported on a structure which can be shifted transversely relative to the longitudinal feeding direction.

This structure is shown as having a top plate AP whose top surface is illustratively below the level of the bottom surface of the plate TP of the applying mechanism when the articles are to be fed forward in their own respective planes. Two side plates 20, 21 extend downward from the plate AP, and are connected to a bottom plate 22 so that a rigid structure is present. The applying machine base BH has two spaced transverse rods 24, 25 fixed therein. The side plates 20, 21 have L-shaped notches 26 for the illustrative upper rod 24, and downwardly-open notches 27 for the lower rod 25: whereby the structure including the top plate TP is supported on the applying machine against relative downward and longitudinal movements relative thereto, but is permitted to slide transversely along the rods 24, 25, and be lifted therefrom. The base BH has journals 30 fixed thereon, in which may be rotated a spindle 31 having a threaded portion 32 of length at least equal to the desired transverse movement of the top plate AP, and also having a hand wheel 33 (FIGS. 2–4) by which the spindle can be rotated. Correspondingly, the side plates 20, 21 have a half-nut 35 and a half-guide 35a fixed thereto and engaged with the threaded portion 32 so that rotation of the spindle 31 produces tranverse movement of plate AP in one direction or the other according to the direction in which the hand wheel 33 is turned. Therewith the plate AP can be shifted between its position shown by full lines and by dash-dot lines in FIG. 4, and noting that the motor DM travels with the plate AP.

Figure 5:
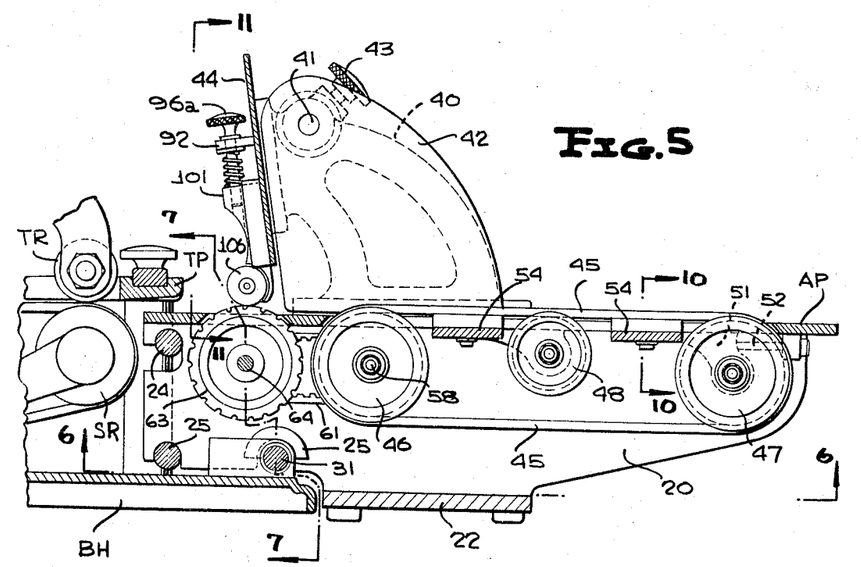
FIG. 5 is an upright section substantially on line 5—5 of FIG. 4.
Figure 6:
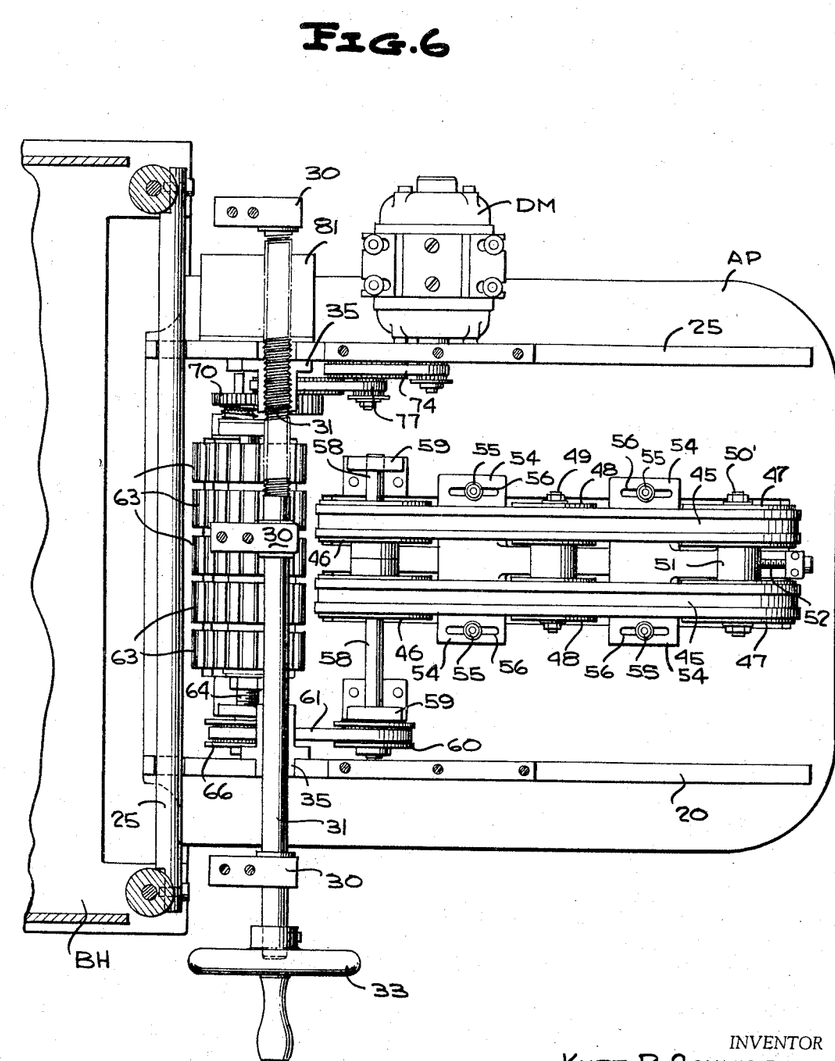
FIG. 6 is a horizontal section of the structure of FIGS. 2 to 5, substantially on line 6—6 of FIG. 5.

The plate AP has two transversely spaced standards 40 fixed to and upstanding from it. The upper parts of the standards have apertures for the rod 41 fixed to guide or cheek plates 42 which present their lower edges close to the plate AP and may be in contact therewith. The guide plates 42 may be shifted transversely of the structure and relative to one another, and fixed in position by the binder screws 43 on the standard 40 and engaging the rods 41. A stop plate 44 is fixed to the standards 40 for controlling the longitudinal position of upper articles in the stack AS. The stack of articles rests on two belts 45 which pass around turning pulleys 46, 47 and are stiffened by support pulleys 48 loosely journaled on a shaft 49 beneath the plate AP (FIGS. 5 and 6). The shaft 50 for the pulleys 47 (FIGS. 5, 6 and 10) is carried by a bracket 51 which can be moved longitudinally by a screw 52 engaged in a boss beneath the plate AP, for controlling belt tension. Further support for the belts 45 can be provided by the blocks 54 which can be held at desired relative longitudinal position by screws 55 passing through slots 56 in the blocks and into the bottom of plate AP. The shaft 58 for the pulleys 47 is mounted in journal brackets 59 on the bottom of plate AP and is provided with a sprocket 60 (FIGS. 6 and 9) for a driving chain-belt 61.

Figure 7:
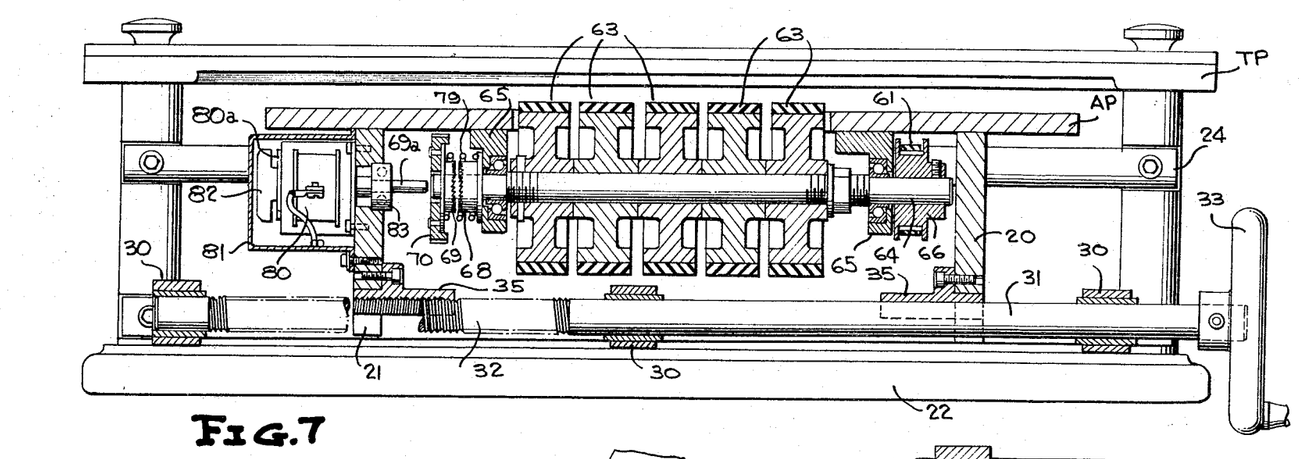
FIG. 7 is an upright transverse section, on a larger scale, substantially on line 7—7 of FIG. 5.
Figure 8:
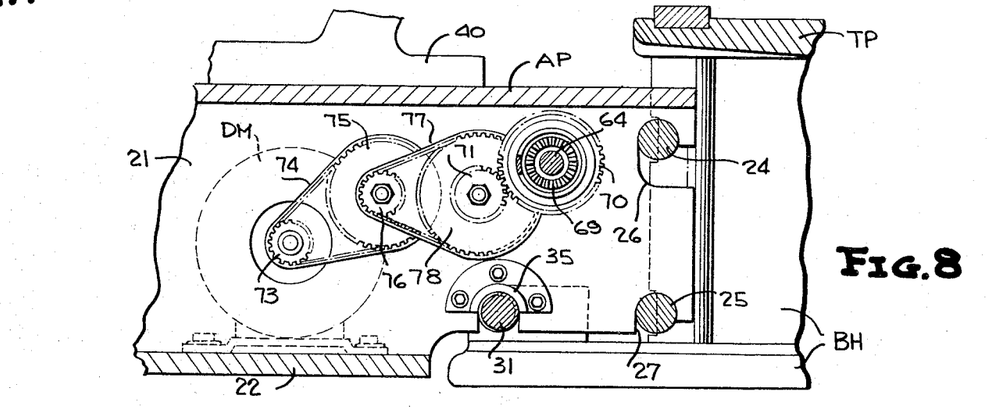
FIG. 8 is a partial upright longitudinal section at the scale of FIG. 7, substantially on line 8—8 of FIG. 3, showing connection and driving parts.
Figure 9:
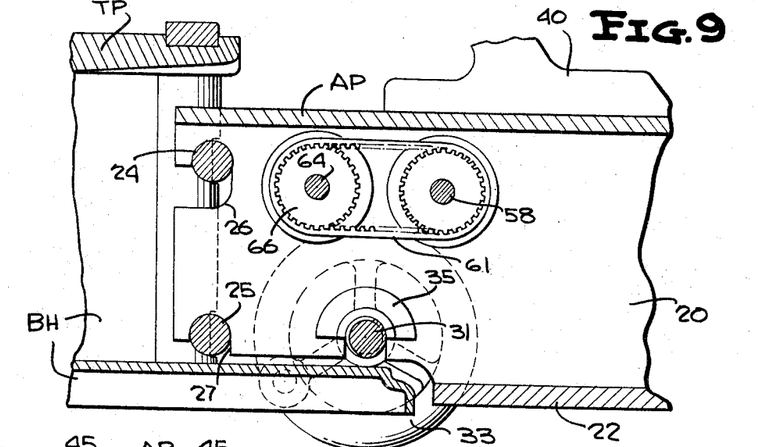
FIG. 9 is a partial upright longitudinal section, on the scale of FIGS. 7 and 8, substantially on line 9—9 of FIG. 3, showing other driving parts.
Figure 10:
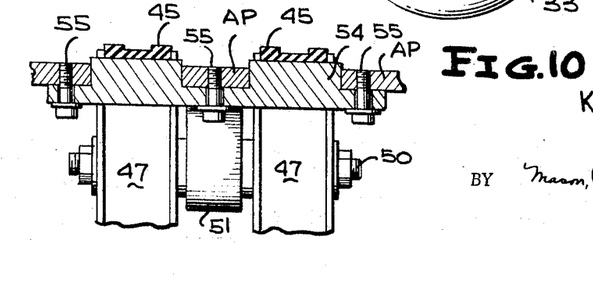
FIG. 10 is a partial upright transverse section, on the scale of FIGS. 7–9, substantially on line 10—10 of FIG. 5.

A number of main feed rollers 63 are fixed on a feed shaft 64 (FIGS. 5, 7 and 8) carried by antifriction bearings in brackets 65 on the bottom of plate AP. Adjacent to the side plate 20 (FIGS. 6 and 9), the shaft 64 has a sprocket 66 for the driving chain-belt 61, by which the sprocket 60 on shaft 58 is driven. Adjacent the side plate 21, the shaft 64 has fixed thereto a clutch element 68 for cooperation with the clutch element 69 which can slide along the shaft 64 and is fixed to a gear 70 (FIGS. 7 and 8) for meshing with the pinion 71. The driving motor DM is mounted (FIGS. 1 and 6) on a projecting part 72 of the bottom wall 22 so the motor travels with the plate AP. The motor shaft has a sprocket 73 for a chain belt 74 engaged with the sprocket 75 fixed to a smaller sprocket 76 for a further chain-belt 77 engaged with the larger sprocket 78 fixed to sprocket 71: thus providing a speed reduction from the motor to the clutch element 69. A spring 79 acts to separate the clutch elements 69, 68. In the form of FIG. 7, the clutch element 69 is integral with an extension 69a coaxial with the shaft 64 and the gear 70, the gear 70 being fixed to the clutch element, and is supported by engagement of the extension 69a in an antifriction bearing 83 carried by a solenoid core or plunger 82. Preferably when the energized plunger movement toward the right in FIG. 7 is stopped by the engagement of the plunger head with the cushion pad 80a, the clutch teeth on element 69 have not bottomed in the teeth of element 68: so there is no endwise shock from the solenoid plunger 82 against the shaft 64 during engagement, and there is no jamming together of the teeth to restrict quick disengagement. In FIG. 7A, the teeth are shown as having symmetrical helical faces: and the engagement is maintained by the solenoid 80 and its plunger 82. When the solenoid is deenergized, the action of the separating spring 79 is assisted by power from the motor DM or by turning force from the rotation of rolls 63 by an article being drawn by the rolls SR, TR (FIG. 5). When the clutch teeth have axial surfaces 68a and helical surfaces 69b, as shown in FIG. 7A, there is a positive drive so long as power is being delivered by the motor DM, but when an article is being drawn by the rolls SR, TR (FIG. 5) at a speed greater than the peripheral speed of the main rolls 63, the rolls 63 and the shaft 64 will be rotated by the article and the angularity of the helical tooth surfaces urges the clutch element 69 toward disengagement, and assists the spring 79 in such action.

In the modified form shown in FIGS. 7A and 7B, the main feed rolls 63 are fixed on a sleeve 64a surrounding the shaft 64, and an overrunning clutch is provided by which the motor DM can act through the clutch 68, 69 and the shaft 64 for driving the feed rolls 63 at a peripheral speed less than that of the rolls SR, TR, but permitting the rolls 63 to be turned at a greater speed by an article which is engaged with the rolls SR, TR. In this case, deenergization of the solenoid 80 allows the spring 79 to disengage the clutch 68, 69, and thereby unloads the motor DM. The drive from shaft 64 to shaft 58 by the chain-belt 61 (FIG. 9) is independent of the overrunning clutch drive 63a to the main rollers 63, and hence the belts 45 can brake themselves and the shaft 64 quickly to a standstill when the motor DM is deenergized. The feed rolls 63 can turn, without drag by the shaft 64 and the belts 45 so long as the article is engaged with them; and this occurs whether or not the motor DM has come to a standstill. If the motor DM is at a standstill when the article leaves rolls 63, the latter are stopped at once by the friction effects of the next article and the separator devices thereon.

In FIGS. 7A and 7B, the shaft 64 has the bearings 64b for the sleeve 64a and is fixed to the notched core 64c for the clutch rollers 63a, these rollers coacting with the flange 63b secured to the main rolls 63 and their sleeve 64a. When the rolls 63 and flange 63b are moved in the direction of the arrow in FIG. 7B, by the article, the rolls 63 can overrun the shaft 64 and turn even if the shaft is at a standstill. If there is no article action upon the rolls 63, and the shaft 64 is driven from the motor DM and in the direction of the arrow, the clutch rollers 63a engage and the rolls 63 are rotated to advance a new article.

Figures 11, 12, 13:
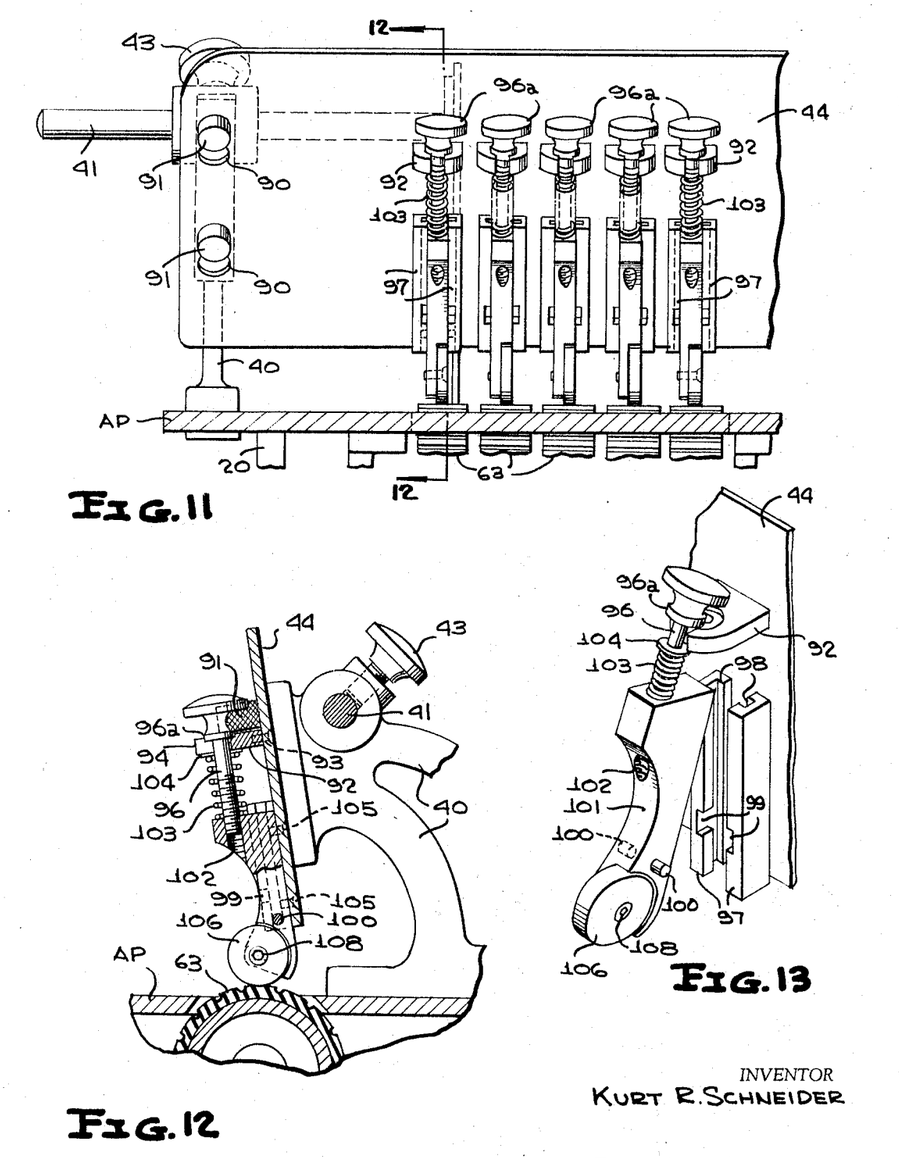
FIG. 11 is a partial upright transverse section, substantially on line 11—11 of FIG. 5.
FIG. 12 is an upright longitudinal section, substantially on line 12—12 of FIG. 11.
FIG. 13 is a perspective view of a separator unit and its mounting.

Separator devices are provided to detain upper articles of the stack while the lowermost is being advanced by the main feed rolls 63. Such devices can be supported on the plate 44 as shown in FIGS. 2, 3, 4, 5, 11, 12 and 13. Five are illustrated. The plate 44 has pairs of keyhole apertures 90 at each side, each with a large bottom portion to slide over the heads of clamping screws 91 which project from the standards 40, and each having an upper narrow portion to embrace the screw shank. Therewith the plate 44 may be fixed in position by sliding it over the screw heads and lowering the plate so that the walls at the upper ends of the keyholes rest on the screw shanks, and tightening the screws into the respective standard 40. For each separator device, the plate 44 has an upper bracket 92 held by screws 93 (FIGS. 3 and 12): the bracket has an aperture 94 with an enlargement at its top (FIGS. 12 and 13) and having its wall cut to receive the shank of the separator screw 96, the screw having an enlarged head 96a at its upper end for engaging the aperture enlargement and thereby being held against movements toward and from the plate 44. The plate 44 also has pairs of rails 97 with upright channels 98 extending parallel to the plate 44 in the illustrative form; these channels being extended laterally by narrow notches 99 for passing the side pins 100 of the separator body 101. This body has a threaded hole 102 in its upper end, for receiving the screw 96. A spring 103 surrounds the shank of the screw and, with the separator in working position, acts between the lower face of the bracket 92 and the body 101 to urge the latter downward and thus retain the screw head in position in the enlargement of the bracket cavity: a washer 104 is preferably present between the spring and the bracket. The rails 97 are fixed to the plate 44 by screws 105. The lower end of the body 101 is cut away for reception of a selector piece 106; with the pieces 106 of the several selectors overlying respective main rolls 63 as shown in FIG. 11. The selector devices can be quickly removed and replaced. For example, when the device is to be replaced, the spring 103 is compressed (FIG. 13) until the shank of screw 96 can pass into the aperture 94 in the bracket 92, with the washer 104 beneath the bracket, the body is rocked about the bracket as a fulcrum until the body 101 enters between the rails 97, with upward pressure on the body as and if needed to cause the pins 100 to pass through the notches 99: when the body is released, the spring 103 causes it to move downward until the pins are in the channels 98 and below the notches 99, with the limit of downward movement determined by the engagement of the screw head 96a in the floor of the bracket depression: the device is thus held against horizontal or downward movements, but may yield upward by compression of the spring 103. The lowermost position of each selector device 106 can be accurately determined by rotating the respective screw 94, so the body 101 is drawn toward the bracket 92 or permitted to move toward the feed roll 63 by the action of the spring.

The nature and effect of the selector pieces 106 can be changed for handling articles of differing surface textures, thicknesses, and stiffness. Thus some may be circular abrasive stones clamped against movement by tightening the screws 108 and adjusted at a distance from the respective feed roll 63 so that the lowermost article moves from the stack with relative freedom, while the stone is encountered by an overlying article which is thus held back: this overlying article can exert an upward force upon the stone and the body 101 which is resisted by the spring, and is detained by the friction of the non-rotating stone against its edge or surface. Others of the selector pieces 106 may be metal wheels which are free to rotate as the articles engage and pass beneath them. In practice, more of the stones are employed when the articles are stiff and wide, e.g. envelopes with catalogs; whereas with thin envelopes or postal cards, one or more stones can be used, with one or more rotatable rolls to press the article against the main rolls 63 to assure regular forward feeding.

Figure 4:
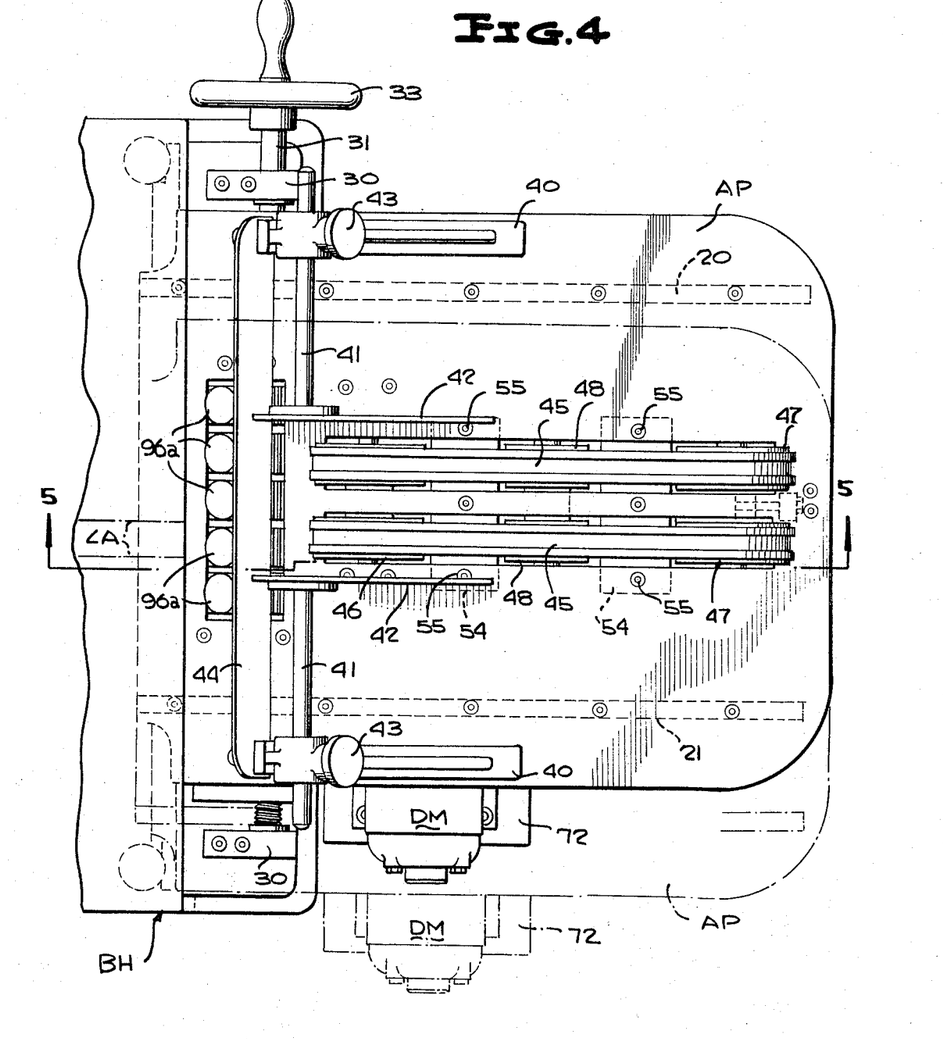
FIG. 4 is a top plan of the structure in FIGS. 2 and 3.

The applying mechanism has the label severing and delivery punch rigidly and fixedly mounted, and thus the labels are being applied at a point fixed relative to the sides of the base BH, shown by the positioning of the roll LSR in FIG. 1 and by the lines LA in FIG. 4.

In the following description of operation, the labels are in a connected strip, with some of the label areas being coded as "improper," indicating that such are not to be applied to articles. The label sensing switch LSS is in lowered or circuit-opening position when there is no label beneath it, or when a coding such as a hole in a label indicates that the label is "improper."

Figure 14:
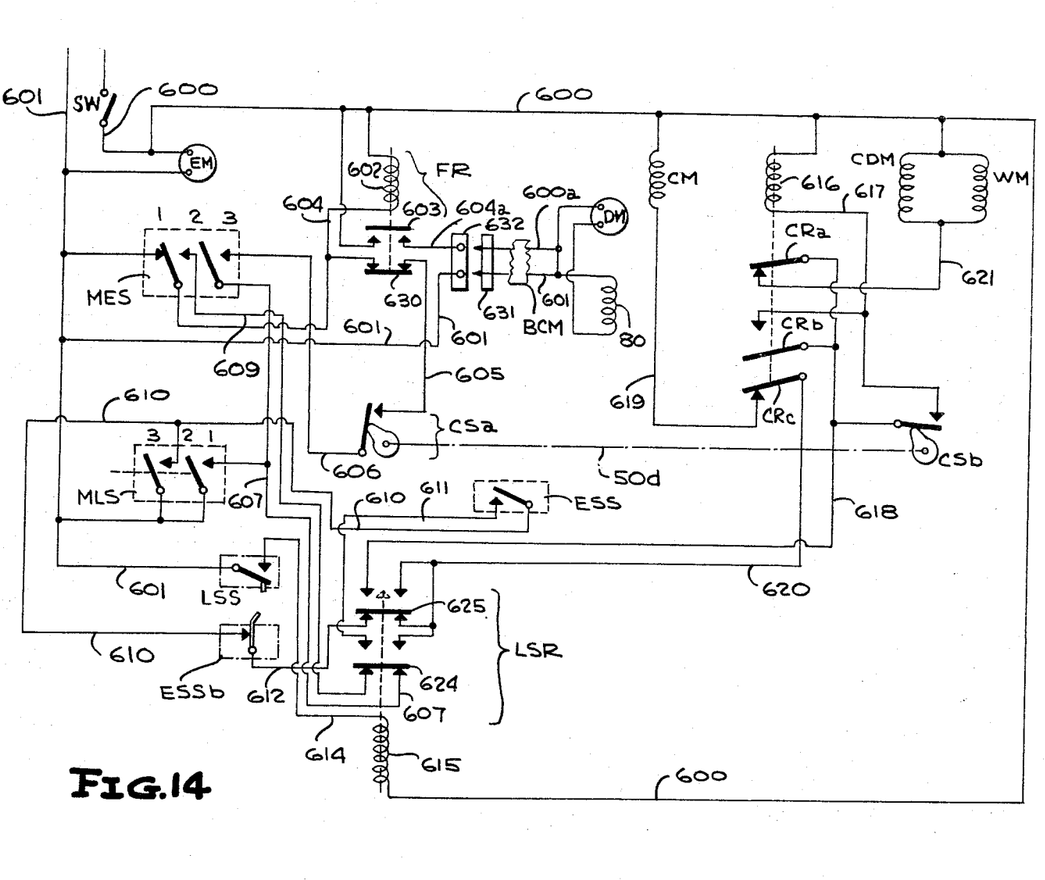
FIG. 14 is a circuit diagram.

The feeding and applying structures of the main machine in base BH may illustratively be as in the aforesaid patents. In operation, the feed relay FR while energized holds the switch bridge 603 open so that feed motor DM is deenergized and no envelopes are fed. Labels from the supply FL are present and are advanced beneath the label to plate SHP. As the leading edge of the strip of labels approaches the top housing TH, the first label is sensed by a label switch LSS. The advancement of the label strip is produced by a single-revolution cyclic shaft 50d controlled by a clutch solenoid CM, and continues until a "proper" label is sensed by switch LSS, which closes and current flows to the coil 615 of label relay LSR. Thereupon circuits controlled by relay LSR effect deenergization of the feed relay FR so motor DM is energized and the feed clutch is closed by solenoid 80. An article advances past the separators 106 and onto the stage system illustrated by rollers SR, being passed beneath a wetting device supplied from reservoir WR through a hose 39 when the wetting solenoid WM is energized, then beneath the housing TH in which are structures (not shown) for severing a label advanced thereto and applying the same to the article, and finally is discharged from the machine as at LA in FIG. 1. During its travel, at a predetermined distance from the separators 106 as fixed by the position of an adjustable article sensing switch ESS, the article closes this switch ESS and thereby effects energization of the solenoid CM so that a cycle of intermittent shaft 50d is initiated. The cycle comprises the advancement of the label, its severance from the strip, and its application to the passing article. A normally closed article switch ESSb is opened by the article when it attains the labeling position or point, and controls circuits for preventing the initation of a new cycle until the article has cleared the switch ESSb and permitted the same to close again. The intermittent shaft 50d has cams for controlling a switch CSa which is open at the end of each cycle, as shown in FIG. 14, but is closed during the major part of the cycle; and a control CSb which is closed momentarily shortly after the cycle starts, but is open for the major part of the cycle. Switch CSb thus energizes the control relay CR at the start of a cycle. Relay CR supervises the article and labeling devices when energized, and the actions of a solenoid CDM for a counting device and at the wetting solenoid WM. A manual article switch MES in the left-hand position of FIG. 14 can procure the regular delivery of articles through the machine without regard to the presence of labels or the position of the label sensing switch LSS. A manual label switch MLS in its left-hand position permits labels to be fed without need for an article acting upon switch ESS; and in its right-hand position procures the delivery of a label only when an article has closed switch ESS.

These effects can be obtained by the circuits shown in the diagram of FIG. 14, in which the parts are supplied from the main conductors 600, 601 when a main switch SW is closed. The switches CSa and CSb are conventionally shown as operated by cams associated with the intermittently driven shaft 50d so that switch CSa is opened near the end of each cycle and is held open until shortly after the start of the next cycle, and switch CSb is momentarily closed shortly after the start of each cycle. The manual envelope switch MES has two poles, both serving to close circuits at contacts 2, 3 when the switch MES is in the right-hand position, but with one closing at contact 1 when the switch is in the left-hand position: when switch MES is in the right-hand position, envelopes are fed under the controlled conditions described below, but when it is in the left-hand position, no envelopes are fed. The manual label switch MLS has two poles, for closing circuits at contacts 1, 2 when in the right-hand position, but closing no circuits when in the left-hand position. The solenoid 602 lifts the bridges 603, 630 of the article feeding relay FR; with the bridge 603 controlling flow from conductor 600 by the separable connections 630, 631 and cable BCM with a conductor 600a to the article feed motor DM and solenoid 80, with return to conductor 601; and with bridge 612 providing a maintaining circuit for coil 602 of relay FR. The solenoid CM controls the clutch for the intermittently moved parts including the conventionalized shaft 50d having cams for the switches CSa, CSb; and is effective to procure closure of the switches and start of a cycle when the solenoid CM is energized. The control relay CR has an actuating solenoid 616 and three switch blades CRa, CRb, CRc, with blades CRa and CRc opening circuits and blade CRb closing a circuit when the solenoid 616 is deenergized. The solenoid WM determines the delivery of water to the wetting device, and is so included in circuit that water is supplied only when a proper label is to be applied to an article in a respective cycle. Solenoid CRM is connected in parallel to solenoid WM and actuates a counting device which thereby serves to indicate the number of labelled articles which have been delivered, without including the number of cycles employed for advancing the label sheet without envelope delivery, e.g., by reason of advancing a fresh label sheet to engagement with the label sensing switch LSS or by reason of the detection and discarding of an "improper" label. The label relay LSR has illustratively two bridges 624, 625 which are in lower position when the solenoid 615 is de-energized by open position of the label sensing switch LSS, and are raised upon energization of the solenoid 615.

The feed relay FR has its coil 602 connected at one terminal to conductor 600 under control of the main switch SW and at the other terminal conductor 604 leads to the manual envelope switch MES, and thence by contact 1 when the switch MES is in the left-hand position to conductor 601, so that current flows through the relay FR, and its bridge 603 is lifted so no current flows from conductor 600 through this bridge and by conductor 600a to the article feed motor DM and the solenoid 80, with return to conductor 601. A branch of conductor 604 leads to a contact for bridge 630 which is closed when relay FR energized; and from the other contact of bridge 630 a conductor 605 leads to a contact of the cam switch CSa, thence by conductor 606 to contact 3 in the manual switch MES which is closed when this switch MES is in the right-hand position; and thence by conductor 607 to contact 1 in the manual label switch MLS, and thence to conductor 601. The conductor 604 is also connected at the manual envelope switch MES, when the switch MES is in right hand position, to contact 2 and thence by conductor 609 to a contact of relay LSR which is closed when this relay is de-energized and its bridge 624 is in lower position, and thus to conductor 607 and by the manual label switch MLS to the conductor 601.

The clutch solenoid CM is connected between the conductor 600 and a conductor 619 which extends to a contact of the control relay CR which is closed when this relay is de-energized and its blade CRc in lower position. From this relay, the circuit continues by a conductor 620 to a contact of the relay LSR which is closed by the bridge 625 when the relay LSR is de-energized, thence by conductor 612 to the second envelope sensing switch ESSb, thence by a conductor 610 to contact 2 of the manual envelope switch MLS, and thence to the conductor 601. A branch of this circuit extends from the conductor 620 to a contact of the relay LSR which is closed by its bridge 624 when the relay LRS is energized, thence by conductor 611 to the first envelope sensing switch ESS and to conductor 610 when the switch ESS is closed, and thence by the label switch MLS to the conductor 601 when switch MLS is in right hand position.

The control relay CR has a solenoid 616 connected between the conductor 600 and a conductor 617. On the one hand, conductor 617 extends to the cam switch CSb so that when this cam switch is closed, a circuit is established by a conductor 618 to a contact of the relay LSR which is closed by bridge 625 when this relay LSR is energized, and thus to the conductor 620. On the other hand, the conductor 617 is connected to a contact of relay CR which is closed by relay blade CRb when the relay CR is energized, and thence to conductor 618, so that the connection between conductors 617 and 618 and the energization of solenoid 616 can be maintained when the cam switch CSb later reopens.

The water control solenoid WM and the solenoid CDM of a counting device are connected in parallel between the conductor 600 and a conductor 621 which extends to a contact of the control relay CR which is opened by its blade CRa when the relay CR is energized, and with the relay de-energized extends to conductor 618 and by bridge 625 of relay LSR to conductor 620 so that the action of solenoids WM and CRM are controlled by relays CR and LSR as well as by the manual label switch MLS and by the envelope sensing switch ESS.

In operation, for normal running, with short envelopes in the stack and ready for use, an initial position is that with the clutch CM de-energized and the intermittent shaft 50d at a standstill at the end of a cycle; the cam switches CSa and CSb are open. The label relay LSR is in de-energized or lower position. The first article switch ESS is open: the second article switch ESSb is closed. Switches MLS and MES are in right hand position, with contact MES–1 open, and the other contacts closed.

When the main switch SW is closed, the motor EM starts, and runs so long as switch SW is closed. In the absence of a label sheet, the label sensing switch LSS is open and coil 615 of the label relay LR is deenergized, and the lower relay contacts are closed by the bridge 624, 625. It will be assumed that energization of the article feed relay FR is occurring by the circuit 600–602–

604–MES contact 2–609–624–607–MLS contact 1–601, so that the relay FR by its bridge 603 holds open the circuit to the feed motor DM and the solenoid 80 and no envelope feeding is then occurring, by the circuit 600–602–604–MES–609–624–607–MLS–601. A circuit is closed from the conductor 600 through the clutch solenoid CM by 600–CM–619–CRc–620–625–612–ESSb–610–MLS–601, so that the main clutch is released and closed, the intermittent shaft 50d turns and cycles are performed. When a label sheet is introduced, the shuttle bars LFB engage it and advance the sheet by one step or label distance for each cycle, until the label sheet comes beneath and closes the label sensing switch LSS.

When the label sensing switch LSS detects a "proper" label, a circuit is closed 600–615–614–LSS–601. The coil 615 is energized and the bridges 624, 625 of relay LSR are lifted. The lower bridge opens the above energizing circuit for the feed relay FR, between conductors 609 and 607. If this occurs after the beginning of a clutch cycle, a maintaining circuit is provided by the path 600–602–604 bridge 630 of FR–605–CSa–606–MES contact 3–607–MLS contact 1–601 until the end of the cycle, thus preventing the immediate advancing of an article by de-energization of the relay FR until the cam switch CSa opens this maintaining circuit. When cam switch CSa opens, the relay FR is deenergized, its bridges drop, and current flows by conductor 600a to the feed motor DM and solenoid 80: this motor turns the main feed rollers 63 and the belt pulleys 47 when the clutch elements 68, 69 are closed by the solenoid 80 as described above for FIGS. 5–10; and an article starts through the machine.

When this article encounters and closes the first article sensing switch ESS, a circuit is established by 600–CM–619–CRc–620–bridge 624 of relay LSR–611–ESS–610–MLS 601, solenoid CM is energized, and a cycle is started.

During running, with continual envelope feeding and delivery of proper labels, and with switches MES and MLS in the right hand positions, the relay FR remains deenergized; bridge 630 and the circuit 604–630–CSa are open and no control is exercised by the cam switch CSa; bridge 603 of relay FR continues the supply of current to the feed motor DM and the solenoid 80 and the articles are successively advanced, and allowed by the selector devices 106 to pass, one by one, onto the stage S: but if either contact 1 of the manual envelope switch MES is closed or the bridge 624 of relay LSR drops upon lack of a proper label at the label sensing switch LSS, an energizing circuit is established to the relay FR so that its bridge 630 is closed, and thereupon the cam switch CSa becomes effective to deenergize the relay FR at the proper point of the cycle of the intermittent shaft 50d: and the relay bridge 603 stops the feed motor DM and deenergizes the solenoid 80.

Shortly after the start of the cycle, cam switch CSb is closed; and a circuit is established 600–616–CSb–618–625–620–624–611–ESS–610–MLS–601. Solenoid 616 is energized and the blades of relay CR are lifted. Blade CRc opens the circuit through solenoid CM, so that the main clutch can open and the intermittent shaft 50d will come to a standstill at the end of a single revolution or cycle. Blade CRb closes the circuit between 617 and 618 so solenoid 616 remains energized when cam switch CSb opens shortly after its momentary closing. Blade CRa opens the wetting circuit 600–WM–612–CRa–618 to determine the make-up flow to the wetting device, and prepares the solenoid CDM for a counting operation.

During such a cycle, the label is advanced to position beneath the punch, the punch is moved down to sever and apply the label to the article, and then is moved up to its initial position. As the label strip moves, the label switch LSS responds to the next lebel. If this second label is also "proper" for application, the switch LSS remains closed and the relay LSR remains in raised position.

The article continues its regular advancement through the machine, and encounters and opens the second article switch ESSb while at the labeling station; but without circuit effect so long as relay LSR is energized. Thereafter, the trailing edge of the article leaves the first article sensing switch ESS so this switch opens and therewith breaks the circuit 600–616–617–CRb–618–625–620–624–611–ESS–610–MLS–601, and the solenoid 616 of the control relay CR is deenergized, so that its contact CRa restores connection, for the next cycle, for the water and counting solenoids WM and CDM, its contact CRb further breaks the maintaining circuit for solenoid 616 noting that the circuit through solenoid 616 has already been broken at the first article switch ESS, and relay contact CRc tentatively closes a circuit through the main clutch solenoid CM, noting that this circuit is open at the article switch ESS but ready for closure when a new article actuates this switch ESS. If the passing article is so long that its trailing edge has not released the first switch ESS before the cycle is completed, the circuit 600–616–617–CRb–618–625–620–624–611–ESS–610–MLS contact 2–601 remains closed, with relay CR energized and its blade CRc keeping the circuit branch 600–CM–619–CRc–620 open so that solenoid CM is not energized and another cycle cannot begin until switch ESS again opens as the article passes it, even though a "proper" label is ready at the label switch LSS. Comparably, if there is an "improper" label at switch LSS, so relay LSR has its bridges in lower position, the circuit which consisted of path 600–616–617–CRb–618–625–620 is broken at bridge 625 and solenoid 616 is de-energized so relay CR closes its blade CRc between conductors 619, 620. However, the circuit 600–CM–619–CRc–620–625–612–ESSb–600 is still open at ESSb until the article has passed switch ESSb.

If the label sensing switch LSS detects an "improper" label which has been advanced during a cycle, it opens; the solenoid 615 is deenergized, and relay LSR drops. A circuit is then established by 600–602– of

FR–604–MES–609–624–607–MLS–601 which energizes the relay FR and stops the feed motor DM and de-energizes the solenoid 80. When bridge 624 of relay LSR drops, the circuit

600–616–CRB–618–625–620–624–611–ESS–610–MLS–601 is opened at both 624 and 625 so 616 is de-energized, and the contact blades of relay CR move down, closing CRc. As soon as the preceeding article has cleared the second article switch ESSb, this switch closes: meanwhile the article has passed from the region at which a label can be applied to it. Upon closure of the switch ESSb, a circuit is closed by 600–CM–619–CRc–620–625–612–ESSb–610–MLS–601 so the solenoid CM is energized, and a new cycle is started by which the label strip is advanced by one step, the punch severs the "improper" label and delivers it against stage rollers SR so that this "improper" label is immediately moved along after the preceding labeled article, and discharged from the machine; noting that article feeding has meanwhile been prevented by the above circuit through conductors 609, 607 and bridge 624 which energizes relay FR and this in turn de-enrgizes the feed motor DM and the solenoid 80. When the switch ESSb closes, also, the circuit 600–616–617–CRb–618 is open at bridge 625 of relay LSR, so solenoid 616 is without energy, and its contact blade CRc can close the circuit 600–CM–CRc–620–625–612–ESSb–610–MLS contact 2–601 for re-energizing solenoid CM and assuring a new cycle. If a succession of "improper" labels are detected, the cycles are repeated until a "proper" label comes to the switch LSS: and at each cycle an "improper" label is removed, but without any feeding of an article until a "proper" label is detected by the label switch LSS.

At times, it is desirable to run the machine with articles only, without applying labels thereto, e.g., in the course of adjusting the position of the article in the machine. For normal running as described above, the switches MES and MLS are in the right-hand position. For feeding envelopes only, the manual label switch MLS is moved to the left-hand position, opening both associated circuits. The envelope switches ESS and ESSb lose control, because their common return conductor 610 is opened at contact 2 of switch MLS; and a closing of ESS does not act by the circuit 600–CM–619–CRc–620-bridge 624 of relay

LSR–611–ESS–610 to energize, nor by 600–CM–619–CRc–620-bridge 625 of relay LSR which is not energized. Thus the solenoid CM does not act to produce cycling of the intermittent shaft 50d, and no label feeding occurs. Also, the circuit 600–602–604–MES contact 2–609-bridge 624 of relay LSR–607-contact 1 of MLS–601 is open at switch MLS, and the feed controlling solenoid 602 remains deenergized regardless of the position of relay LSR. The branch of the latter circuit by 604-bridge 630 of relay FR–605–CSa–606-contact 3 of MES–607 is also open at MLS. In this deenergized condition of solenoid 602, relay FR is in its lower position, and the circuit 600-bridge 603–600a–632–631 to DM and 80, with return to conductor 601 assures the continued movement of envelopes.

If it is desired to effect the label feeding in the absence of article feeding, the switch MES is moved to the left. The circuit by 600–602–604–MES at contact 1–601 is closed: the relay FR is continuously energized, feed motor DM and the solenoid 80 are not energized, and no articles are fed. Assuming that there are no label in the machine, and that a fresh sheet is introduced, the label switch LSS is open, the solenoid 616 de-energized, and the bridges 624, 625 of relay LSR are in lower position. Current then passes by the path 600–CM–619–CRc–620–625–612–ESSb–610–MLS contact 2–601 as soon as switch ESSb is closed, that is, at once if there is no article in the machine or as soon as a passing article has left switch ESSb. Energization of the solenoid CM causes the clutch to close and a succession of label feeding cycles occur, until the switch LSS is moved by a "proper" label. The solenoid 615 is then energized, the bridges 624, 625 of relay LRS are lifted, and the circuit through solenoid CM is broken between conductors 620, 612.

The switch MES can be moved at any time, to stop articles movement. Thereafter, it can be closed at any time, between cycles or during a cycle. The cam switch CSa is closed for succession of cycles except for brief periods which begin at the close of one cycle and end after the start of the next cycle, so that the switch CSa is open if the intermittent drive stops at the end of a cycle. The switch CSa, being closed for the major part of the cycle, acts in conjunction with bridge 612 which is closed when solenoid 602 is energized to prevent article feed, to maintain the energization of solnoid 602 until switch CSa determines the proper time in cycle for the next article to be fed. If the article switch MES is moved to the right hand position, to re-start article feeding while a cycle is in progress, the closing of contact 3 of switch MES occurs before de-energization of coil 602 of the relay FR has caused opening of the bridge 630 and switch CSa now maintains energization of the relay FR by the said path

600–602–604–630–MES (contact 3)–607 MLS contact 1–601 until the switch CSa opens at the end of the cycle. If the article switch MES is moved to the right when the intermittent shaft 50d is at a standstill at the end of a cycle, the switch CSa is open, the relay FR has been energized by contact 1 of switch MES; and when switch MES is moved to open its contact 1 and close its contact d, the said maintaining circuit is now open at CSa so coil 602 of the relay FR is at one deenergized, the motor DM and solenoid 80 are energized and an article starts; and bridge 630 is opened.

If it is desired to inspect the operation of the label feeding system without feeding of articles then in the machine, for example, to determine that the label feeding devices deliver the labels to proper position for severance, or to determine the sharpness of the punch and die plates, the switch MES can be moved to the left, and a label sheet having all label areas marked as "improper" is fed to the machine. The individual labels are fed, cut, and discharged. If there are not articles in the machine, no movement of the switch MES is necessary for such inspection.

The circuitry establishes control of the water supplying and counting devices, so these operate only when an article is being labeled. Thus, with postal addressing, the counter shows the number of items which are to be mailed. Comparably, there is no supplying of moisture when no article is being fed to the label applying point. At the start of operations, with the blades of relay CR in lower position, a tentative circuit is set up by the path 600–WM and CDM in parallel - 621–CRa–618–625–620–624– 611–ESS–610–MLS–510 but this is open at 625, 624, ESS in the absence of labels and articles regardless of the position of relay CR. When a label sheet is supplied, the preliminary advancement occurs without moisture delivery or counting. The first "proper" label acts at switch LSS to energize relay LSR and close this tentative circuit 624, 625; but it is still open at the article switch ESS. When as article closes switch ESS, the clutch solenoid CM is energized, as set out above, to start a label cycle, and also the current then flows through the said tentative circuit: the solenoid WM opens the water supply valve, and solenoid CDM sets the counter device. The cycle of shaft 50d starts, and the relay CR is energized a short time after such starting, so that blade CRa again opens the circuit. Thus current supply to and energization of the solenoids WM and CDM are coordinated in the cycle, as short pulses each time that both article and label are present for attachment to one another. When an "improper" label is detected by switch LSS, the said tentative circuit is broken at bridges 624, 625 of the relay LSR. When no article is passing, the circuit is broken at switch ESS. When a passing article clears the switch ESS, this switch opens and flow of current in conductor 620 ceases even though a "proper" label has been sensed. Therewith the maintaining circuit 600–616–617–CRb–618–625–620 is also opened, and relay CR assumes the lower position until the next article closes the switch ESS: hence, a water delivery and a counting occurs for this new article. When switch MSL is in the left hand position, this tentative circuit is open at its contact 2.

The instant article feeding structure permits the placing of the article stack AS in position on the belts 45 and aligned with the main feed rolls 63 at a relative transverse position at which the feeding is optimum, noting that changes may be made so that the weight distribution on the feeding devices is balanced. The guide plates 42 are then adjusted to the width of the article stack, for easy downward movement as the articles are drawn from the bottom of the stack: and the plates 42 are fixed by screws 43. It will be noted that this can be done without attention to having the articles transversely aligned so that the desired area of each is presented in the longitudinal line for label application. After the adjustment of the stack on the plate AP and the associated structures, the handle 33 is operated as necessary to shift the stack and guides until the desired application area is aligned with the applying plunger. This is indicated in FIG. 4, where the label applying devices will apply a label at a region between the lines LA. When the plate AP and associated parts are in the full line position, the label will be applied adjacent the lower edge of an article moving from right to left in FIG. 4: when the plate AP is in the dash-dot position, the label is applied adjacent the upper edge of the article. Such adjustment can be made while the apparatus is operating, without danger of collapse of the article stack by separating the guide plates 42: and very accurate placing of labels can be effected by the threaded adjustment effect of spindle 31, 32.

The arrangement also has advantage for easy repair and adjustment of the article feeding parts. By disconnecting the end 631 of the cable BCM, FIG. 1, from its jack receptacle 630 on the base BH, and lifting the feed table assembly by its plate AP, the feed structure is separated and may be replaced by another. This permits setting up one assembly of a plate AP and parts for one type of articles which are frequently to be labeled, e.g. a standard size and material of envelope with a normal weight and thickness of contents, and another assembly for larger envelopes of rougher paper stock and having thicker and heavier contents. Therewith, the lengths of the plates AP, the number, length and type of belts 45, the heights of the plates 42, 44 the structure of the feed rolls 63 and the coacting separator pieces 106 and their adjustments, and the speeds of the belts 45 and feed rolls 63 can be different and therewith preserve a condition of assembly and adjustment which was found optimum for the last run of the specific articles.

The second form of embodiment, shown in FIGS. 15 to 19, likewise has a removable stack support. The apparatus for treating the articles is illustrated as a label applying mechanism of the general structure and operation shown in U.S. Patent 2,907,567, particularly FIGS. 5, 5a, 6, 7 and 8 thereof.

Figure 15:
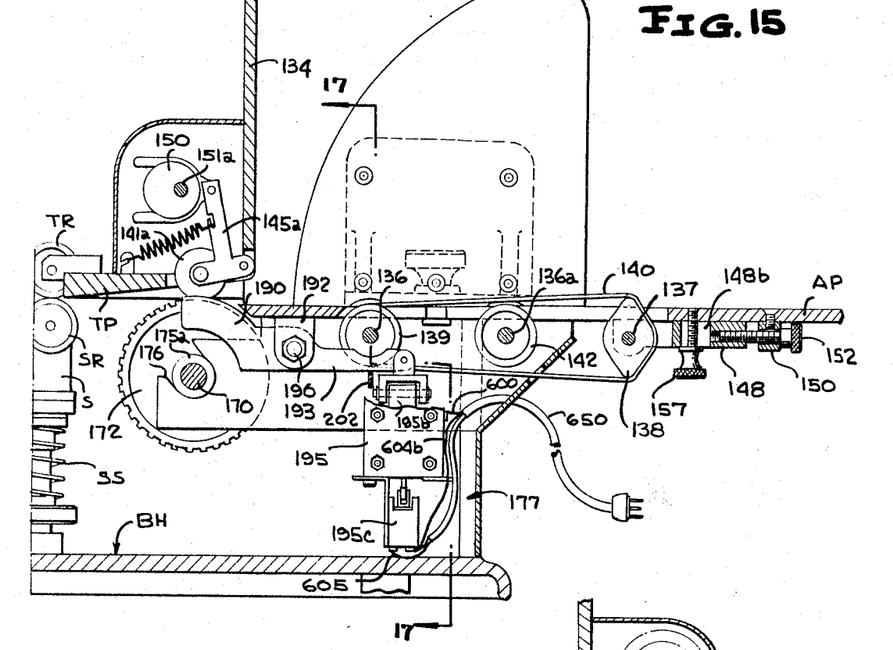
FIG. 15 is an upright longitudinal sectional view corresponding to FIG. 5 and showing a second form of practice.
Figure 16:
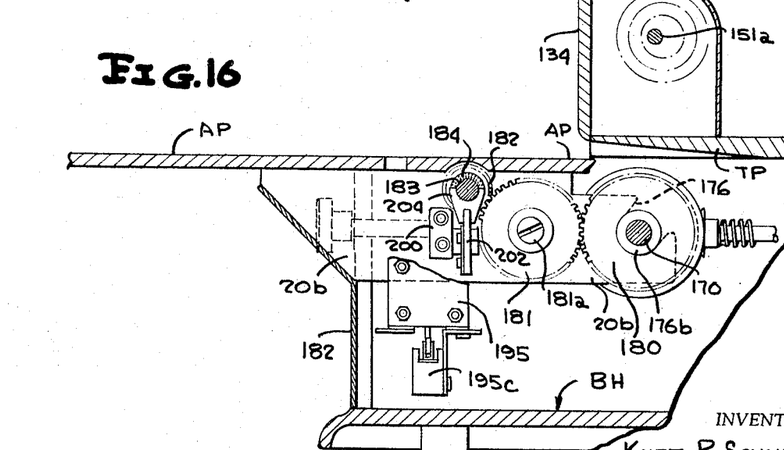
FIG. 16 is an upright longitudinal sectional view substantially on line 16—16 of FIG. 17, of the second form.
Figure 17:
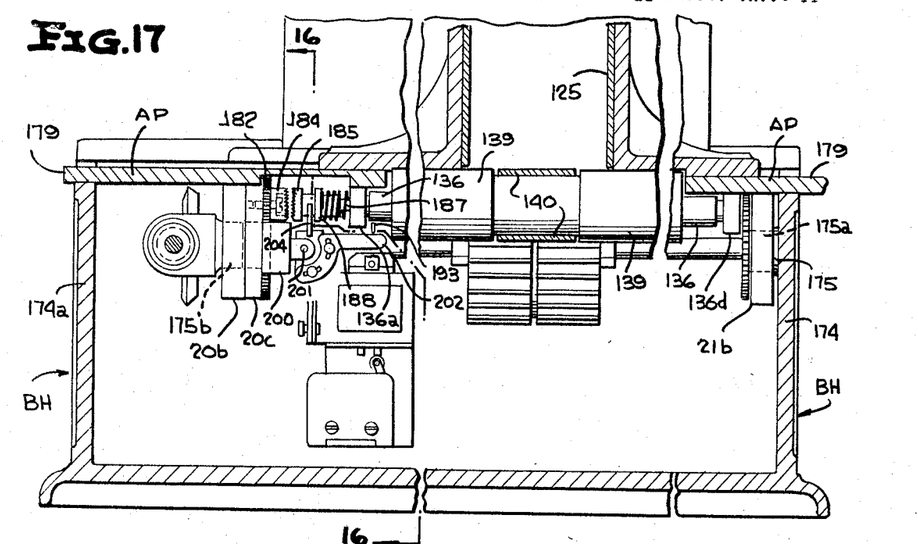
FIG. 17 is an upright transverse sectional view substantially on line 17—17 of FIG. 15.
Figure 18:
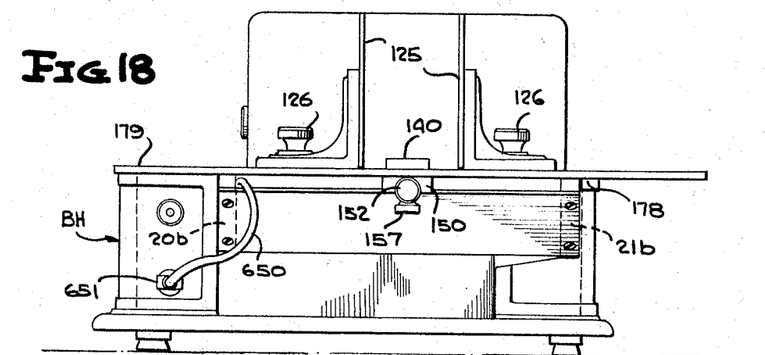
FIG. 18 is a rear elevation, on a reduced scale, of the second form.

FIGS. 15-17 of the instant drawings show a table top plate AP having at its lower face stiffening side plates 20b, 21b and brackets for the transverse shafts 136, 136a and having a block 148 supporting the shaft 137. These shafts carry rollers 139, 142, and a non-round or wobble pulley 138. A belt 140 moves and is guided by reduced portions of the rollers 139, 142 and the wobble pulley 138. The belt tension can be adjusted by loosening the bolt 157 and turning the tension screw 152 carried by bracket 150 beneath the table top AP, and re-tightening the screw 152: the block 148 has an opening 148b larger than screw 152 to permit the relative movement of the block.

Brackets 192 on the bottom of the table top AP support a cross shaft 191, which has feed controlling fingers 190 fixed thereto and a lever arm 193. A solenoid 195 is supported from the bottom of the table top AP on a bracket 195a. The solenoid core 195b is drawn downward when the solenoid is energized, and then acts on arm 193 to lift the fingers 190 so no articles are fed. A switch 195c is supported by the solenoid body assembly, to be closed when the solenoid is energized.

A rock lever 202 is carried by a pivot 201 on a bracket 200 fixed on an attachment piece 20c secured inside the side plate 20b which in turn is fixed beneath the table top AP. The lever 202 extends beneath the lever arm 193, to be rocked clockwise in FIG. 17 when the solenoid 195 is energized. The lever 202 has an upwardly projecting fork 204 with the reduced central portion of a clutch structure having clutch teeth 185 and a collar 188 spaced therefrom so that fork 204 can effect clutch disengagement when the solenoid is energized. The clutch assembly is axially movable on a reduced end of shaft 136 and keyed to turn this shaft 136. The cooperating and coaxial toothed clutch element 184 has a gear 182 fixed thereto, and is mounted on a stub shaft 183 screwed into the side plate attachment 20c. A spring 187 around a reduced portion of the movable clutch structure acts between a journalling bracket 136a for the shaft 136 and the collar 188 to engage the clutch teeth when the solenoid 195 is deenergized and therewith to rock the lever arm 193 and the feed fingers 190 to article releasing position and to lift the solenoid core 195b.

The feed roll shaft 170, is journaled in bearings in the main machine base BH; and has a gear 180 thereon. Meshing with gear 180 is an idler gear 181 carried by a stub shaft screw 181a on side plate 20b. The latter gear 181 is in mesh with gear 182 so that when the removable table structure is in position on the main machine base, rotation of the feed roller shaft 170 produces a rotation of the clutch element 184; and, further, with the solenoid 195 deenergized so the clutch element 185 is engaged with clutch element 184, a driving of the shaft 136 is engaged with clutch element 184, a driving of the shaft 136 and therewith of the rolls 139, 142 and the belt 140 occurs and the articles of the stack are urged toward the main feed rolls 172 on shaft 170.

According to the second form of the instant invention, the base BH of the main machine structure includes an upright side wall 174 at the right in FIG. 17 which has an inwardly extending boss 175 having an extension 175a which (FIG. 15) in the assembled position of the table structure is in the notch 176 of the side plate 21b of the removable table. The top plate AP of the removable table rests on the upper edge of the side wall 174, and also on the upper edge of the left-hand side wall 174a (FIG. 17), noting that the lateral margins 179 of the plate AP may project beyond the side walls. The extension 175a is concentric with the main feed roller shaft 170 (FIG. 15) and provides a bearing support therefor. As shown in the aforesaid patents, a shaft 500 is driven constantly by a motor corresponding to he main motor EM herein; a bevel gear 501 on the shaft 500 is in mesh with the bevel gear 502 fixed on the main feed shaft 170 for driving the same. The shaft 500 is shown as journaled in a standard 503 mounted on the floor of the base BH and providing a bearing support for the shaft 170 and having a cylindrical extension 175b concentric with the shaft and in the assembled position of the table structure is in the notch 176 (FIG. 16) of the side plate 20b of the table structure. The notches 176 of the side plates 20b, 21b are directed upwardly and to the left in FIG. 15, for closely receiving the extensions 175a, 175b when the removable table is in place and resting on the side walls 174, 174a. The rear wall 177 of the main machine base is notched downward below the table AP, to permit easy reception of the solenoid 195 and its associated switch 195c. A baffle or closing plate 177 (FIGS. 15 and 18) extends over the notch in wall 177, and is secured to the lower inclined edges of the table side plates 20b, 21b.

The other machine parts can be as in Patent 2,907,567, including the driving motor, stage structure 8, with springs SS for urging the same upward and driven stage rollers SR, the upper counter roller TR, the top plate TP, feed rollers 172, separator devices 141a on levers 145a and having controls by cams 150a on shaft 151a.

Figure 19:
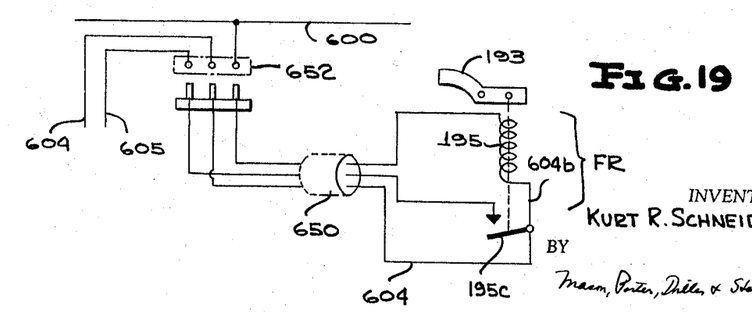
FIG. 19 shows part of a circuit diagram as in FIG. 14, modified for the second form of practice.

Electrically, the parts and circutry can be as in FIG. 14 with change of the feed relay FR connections so this relay can be mounted on the removable structure. Thus the relay FR (FIG. 19) has the energizing solenoid 195 (FIG. 15) in place of the solenoid 602 of FIG. 14, and has a single switch 195c in place of the bridges 613, 630 of FIG. 14. The relay FR controls the feeding of articles by raising the feed fingers 193 when the relay is energized. As shown in FIG. 19, the main conductor 600 is connected at one pole of a separable connector 652 which has other poles connected to the conductors 604 and 605 of FIG. 14. The second part 653 of the separable connection has corresponding conductors in a cable 650 whereby the switch 195c is connected to conductors 604 and 605, and one terminal of the solenoid 195 is connected to conductor 600. A jumper 604b connects the other solenoid terminal to conductor 604. The electrical operation and sequences are essentially the same as with FIG. 14, except that continuous feeding of articles is being urged by the driving of belt 140 from gear 180 on the feed roller shaft 170 which is being driven by the main motor EM as in Patent 2,907,567, and energization of the solenoid 195 in the feed relay FR acts mechanically by the feed fingers 193 to stop article feeding.

The circuit arrangement can be as in FIG. 14, with a change as shown in FIG. 19. The feed relay 195 and its switch 195c are on the removable table structure, and hence the receptacle 652 for jack 651 is connected to the conductor 600, and is connected by conductor 604 to switch MES and by conductor 605 to the cyclic switch CSa of FIG. 14. Thus the electrical parts on the removable table (indicated by the frame 620 in dash lines in FIG. 19) may be disconnected at the parts 651, 652.

The electrical operations are essentially the same as with the first form, except that the feed motor DM and solenoid 80 are dispensed with, and a mechanical drive from the main machine motor is employed through gears 180, 181.

In the operaiton of many article handling machines such as the illustrative label applying machine, the operator may have a few sizes of articles which constitute the bulk of his work, but with a day's run including groups of each size. With the illustrated equipment, several removable table assemblies may be provided. These may have differing ratios of drive between the gears 80 and 81, with the hopper guide walls adjusted for a selected one of the article sizes. When the operator has finished a run with articles of one standard size such as mailing envelopes, the rear end of the table assembly can be raised and drawn backward so that the notches 176 leave the bosses 175 and such assembly removed from the machine base. Another pre-adjusted table assembly for the next run of a different size is then attached to the machine base by placing it so the front edge of the bottom surface of the table top AP rests on the upper edges of the side walls 174, 174a and the assembly is slid forward until the notches 176 thereof are initially engaged with the extensions 175, 175a and then the rear of the assembly is rocked down with a minor forward movement until the new table assembly thus assumes its preset and proper position for service. It is preferred to have the upper edges of the side walls 174, 174a at a lower level beneath the removable table plate AP than beneath the front plate TP so that solid support is present for both plates, with the lower surface of plate TP above the level of the top of the plate AP, so that articles fed from the top of plate AP and feed rollers 172 will pass directly onto the stage roller SR and beneath the top or counter roller TR.

The removal of the table assembly exposes parts of the machine which have been covered thereby and permits easy inspection of the main feed rolls, their shaft, and its drive: and these are again protected from contact when the new table assembly is placed in position.

As the assembly approaches its final position, the idler gear 81 comes to the drive gear 80, and the final rocking of the assembly as the notches 176 engage the bosses 175 and as the assembly side plates hook around the extensions 175a, 175b, the table assembly is drawn to a rest position upon the side plates in which the gears are properly meshed, noting that gears 81, 82 are free to turn. This engagement can be at any part of gears 80, 81 because their phase relationship is no part of a predetermined cycle.

Each of the table assemblies of this second form includes the hopper side walls 125 set at the proper spacing, a drive transfer system proper for the feeding of the articles of the associated group, the feed fingers 190 for cooperation with the main feed rollers 172 of the main machine for such articles, and a solenoid 195 with associated parts for moving the feed fingers and for determining the engagement and disengagement of the clutch which controls the advancement of articles toward the main feed rollers by supervision of the movement of the belt 140 and the feed rollers 139, 142. The tension on the belt 140 most proper for the articles of the specific group can be set and retained. Thus, when the second run has been completed, if the third run is to be of articles identical with the first, the operator removes the second table and returns the first: and therewith is ready to proceed at once without down time for tentative and final adjustments.

With each form, the manager of a mailing office can set up and adjust a removable hopper or feeding supply assembly at optimum conditions for a given size of article: and bring such to service for a run of such articles by placing it in position upon the labeling or other treating mechanism. The time required in passing from one standard size to another is thereby kept low, and the machine assemblies can operate upon such standard sizes essentially continuously upon consecutive runs. The changes can be accomplished by the service operator with need of a maintenance mechanic to set and check the machine before each run.

It is obvious that the illustrative embodiments are restrictive: and that the invention can be practiced in many ways within the scope of the appended claims.

What is claimed is:

1. An apparatus of the class described including means for treating articles, means for moving the same individually along a predetermined path to the treating means, a first support for said treating and moving means, a second support for removable association with said first support, means on said second support including devices for advancing and guiding a stack of articles whereby the articles can be delivered one by one to said moving means, interengaging parts on said support for fixing their relative position when brought together, means connecting said article treating and moving means and said advancing and guiding devices to procure operation thereof in unison, said second support is shiftable transversely relative to said path while said parts are interengaged, means for shifting the second support and fixing it at a selected position relative to said path, said means includes a screw member and a half-nut member engageable with the screw member, one member being on the first support and the other member being on the second support, said members being positioned and arranged so that they are engaged when the said interengaged parts are brought together.

2. The apparatus of claim 1, in which the first support includes rails extending transversely of the said path, and the second support includes open notches for interfitting said rails so that the walls of the notches form elements of said interengaging parts, and said screw member is journaled on said first support and extends parallel to said rails.

3. An apparatus of the class described including means for treating articles, means for moving the same individually along a predetermined path to the treating means, a first support for said treating and moving means, a second support for removable association with said first support, means on said second support including devices for advancing and guiding a stack of articles whereby the articles can be delivered one by one to said moving means, interengaging parts on said supports for fixing their relative position when brought together, means connecting said article treating and moving means and said advancing and guiding devices to procure operation thereof in unison, said support includes upright walls in which the removable second support includes a table for resting on upper edges of said walls and the interengageable parts include elements for restricting relative transverse movement of said supports, and in which the said moving means includes a gear mounted on the first support and the advancing devices include a gear on the second support, said gears being positioned and arranged for interengagement when the said interengageable parts are brought together.

4. The apparatus of claim 3, in which the advancing devices include an over-running clutch, and in which the moving means is effective to move the articles at a greater rate of speed than the advancing devices.

5. The apparatus of claim 3, in which the moving means include feed rollers, and in which the second support has article controlling means thereon, the inclusion therewith of means controlling by the treating means for energizing an electrical circuit when the treating means is in condition to receive an article, and a solenoid mounted on the second support and connected in said circiut for determining the action of said article controlling means.

6. An apparatus of the class described including means for treating articles, means for moving the same individually along a predetermined path to the treating means, a first support for said treating and moving means, a second support for removable association with said first support, means on said second support including devices for advancing and guiding a stack of articles whereby the articles can be delivered one by one to said moving means, interengaging parts on said supports for fixing their relative position when brought together, means connecting said article treating and moving means and said advancing and guiding devices to procure operation thereof in unison, said support has a first electric motor thereon for actuating said moving means, a cylindrically driven shaft, and means for actuating said shaft from said motor under control of a solenoid, said shaft being effective when actuated to drive the treating means, a first electric switch responsive to the treating means when the same is in readiness to treat an article, a second electric switch responsive to the presence of an article at said moving means and effective to control the energization of said solenoid, and in which the second support has an electromagnetic device for controlling the delivery of articles from the said advancing device to the said moving means, and an electrical connection from said first electric switch to said electromagnetic device.

7. The apparatus of claim 6, in which the said electromagnetic device includes a second electric motor on said second support for driving said advancing device, with inclusion of a clutch between said second motor and the advancing device, and in which the said electromagnetic device includes a second solenoid, said second solenoid being mouted on said second support and being connected for controlling said clutch.

8. The apparatus of claim 6, in which the said moving means includes a feed roller journalled on the first support and connected to be driven by said first electric motor, and in which an article feed controlling device is mounted on the second support, and said electromagnetic device is effective to actuate said feed controlling device.

9. An article feeding apparatus comprising a main frame, a screw journalled in the frame with its axis transverse to the direction of article feeding, a separate auxiliary feed table for the articles, threaded means on the table in engagement with the screw, article aligning means on the table, and means for engaging and disengaging the screw and threaded means in the absence of relative rotation therebetween whereby the main frame and the auxiliary feed table are readily disengaged and re-engaged with each other.

10. An apparatus as in claim 9, in which said threaded means includes a half-nut for engaging the screw, and cooperative assembly parts on the frame and the table whereby the table may be connected to and removed from the frame incidental to the engagement of said half-nut with the screw.

11. An apparatus as in claim 9, including pulleys mounted on the table, a belt engaged with said pulleys, a power device connected to the table and drive means between the power device and the pulleys.

12. An apparatus as in claim 9, including a main feed roller and pulleys mounted on the table, a belt engaged with said pulleys, a power device connected to the table and drive means between the power device and the pulleys, and an overrunning clutch through which the drive means can rotate the main feed roll and effective when said drive means is not acting to permit the rotation of the main feed roll independently of the pulleys.

13. An article feeding apparatus comprising a frame, means on the frame for advancing the article along a predetermined path, a screw journalled on the frame with its axis transverse to the direction of said path, a feed table for the articles and article aligning means on said table, and threaded means on the table for engagement with the screw, said screw being effective to move the table transversely to effect positioning of the aligned articles with said path.

14. An article feeding apparatus comprising a frame, means on the frame for advancing the articles along a predetermined path, a table mounted to be shifted in a direction transverse to said path, article aligning means on said table, and cooperative threaded parts on the frame and table including a rotatable screw positioned with its axis transverse to the direction of said path and a nut engaged with said screw, said threaded parts being effective upon rotation of the screw to shift the table relative to the frame.

15. An article feeding apparatus comprising first and second supports, means for feeding articles along a predetermined path in a direction from said first support toward said second support, cooperative means between said first and second supports for shifting said supports relative to each other in a direction normal to the path of article travel, said cooperative means including complementary threaded portions carried by each support in interengagement with each other whereby relative movement between said interengaged threaded portions causes relative shifting movement of said supports transverse to the path of article travel, and said cooperative means include means for disengaging said inter-engaged complementary threaded portions in the absence of relative rotation therebetween whereby said first and second supports are readily disengaged from one another.

16. An apparatus of the class described including means for treating articles, means for moving the same individually along a predetermined path to the treating means, a first support for said treating and moving means, a second support for said treating and moving means, a second support for removable association with said first support whereby articles on said second support can be transferred to said first support along said predetermined path, means for shifting said first and second supports relative to each other transversely of said path when said parts are interengaged, said shifting means including a screw member and a half-nut member engageable with the screw member, one member being on the first support and the other member being on the second support, and means for automatically effecting the engagement of the screw member and the half-nut member upon the relative engagement of said first and second supports.

References Cited
UNITED STATES PATENTS

| | | | |
|---|---|---|---|
| 939,177 | 11/1909 | Stickney | 271—35 |
| 1,202,315 | 10/1916 | Reifsnyder et al. | |
| 1,671,688 | 5/1928 | Staude | 271—61 |
| 1,948,001 | 2/1934 | Mensman et al. | 271—61 |
| 2,241,268 | 5/1941 | Nelson. | |
| 2,570,876 | 10/1951 | Sloyer | 156—572 X |
| 2,660,431 | 11/1953 | Levin | 271—61 X |
| 2,907,567 | 10/1959 | Schneider et al. | 271—35 |

EARL M. BERGERT, *Primary Examiner.*

J. P. MELOCHE, *Assistant Examiner.*